United States Patent

[11] 3,542,138

| [72] | Inventors | Kenneth C. Fackler<br>Anchor;<br>Wayne A Scott, Saunemin, Illinois |
|------|-----------|---|
| [21] | Appl. No. | 722,627 |
| [22] | Filed | April 19, 1968 |
| [45] | Patented | Nov. 24, 1970 |
| [73] | Assignee | The M & W Gear Co., Inc.<br>Gibson City, Illinois<br>a corporation of Illinois |

[54] LOCK STRUCTURE FOR FOLDING TOOL BARS
7 Claims, 8 Drawing Figs.

[52] U.S. Cl. .................................................. 172/776,
280/411, 16/147, 172/311
[51] Int. Cl. ............................................... A01b 23/04
[50] Field of Search .......................................... 172/311,
310, 456, 749, 751, 753, 568, 776; 280/411, 414;
16/147; 56/Inq

[56] References Cited
UNITED STATES PATENTS

| 1,148,791 | 8/1915 | Nelson | 280/411 |
| 2,636,568 | 4/1953 | Rutishauser | 180/53 |
| 2,712,280 | 7/1955 | Peoples | 172/751X |
| 3,032,353 | 5/1962 | Williams et al. | 280/414 |
| 3,425,194 | 2/1969 | Scott et al. | 56/15 |

*Primary Examiner*—Robert E. Pulfrey
*Assistant Examiner*—Stephen C. Pellegrino
*Attorney*—Molinare, Allegretti, Newitt & Witcoff ABSTRACT: Relatively wide agricultural implements provided with "tool bars" are advantageously folded for decreasing their width for transport through farm gates and on the road. The tool bars are provided with hinges to facilitate the folding operation. A simple and easily operable positive lock structure is provided for certain of these hinges.

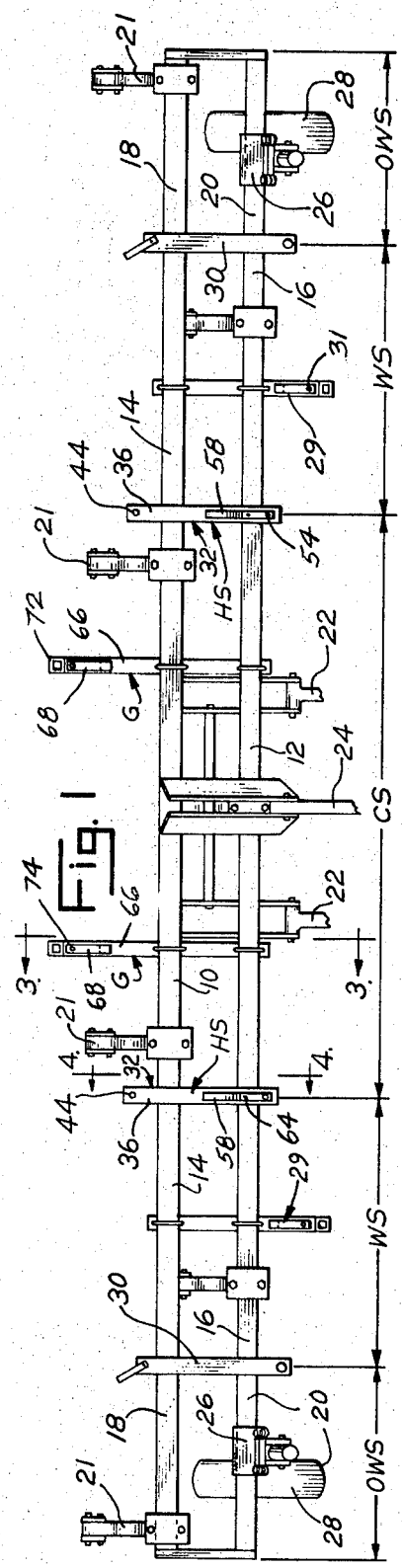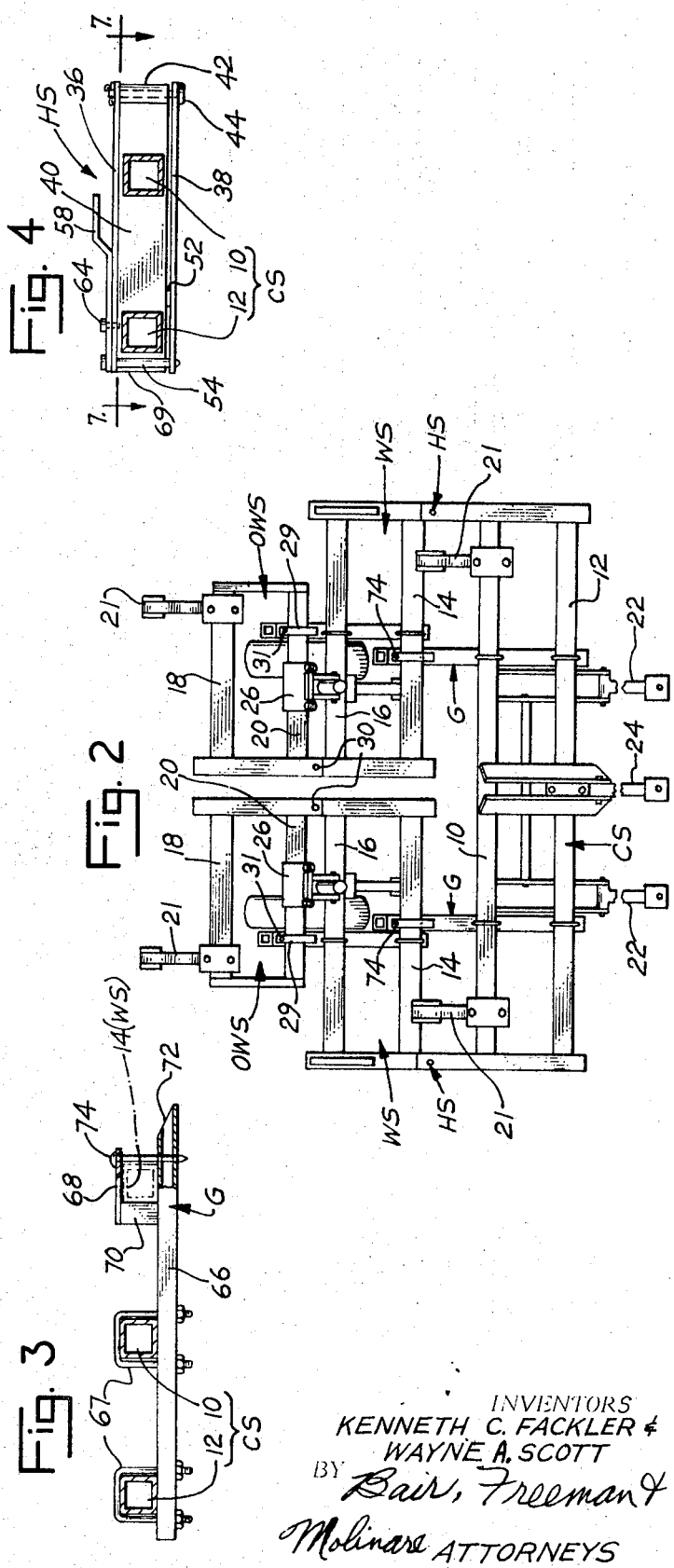
Patented Nov. 24, 1970 3,542,138
INVENTORS
KENNETH C. FACKLER &
WAYNE A. SCOTT
BY Bair, Freeman & Molinare ATTORNEYS Patented Nov. 24, 1970
3,542,138
Sheet 2 of 2
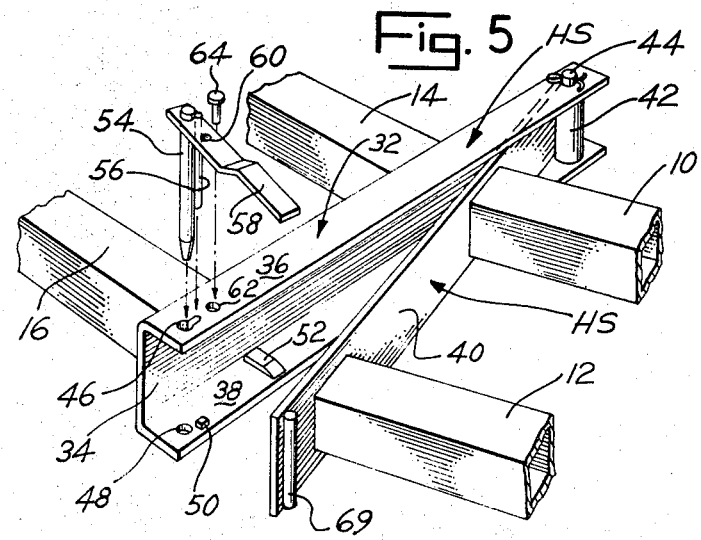
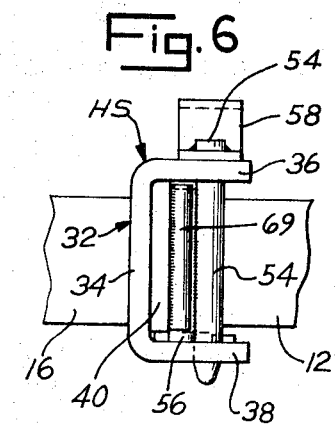
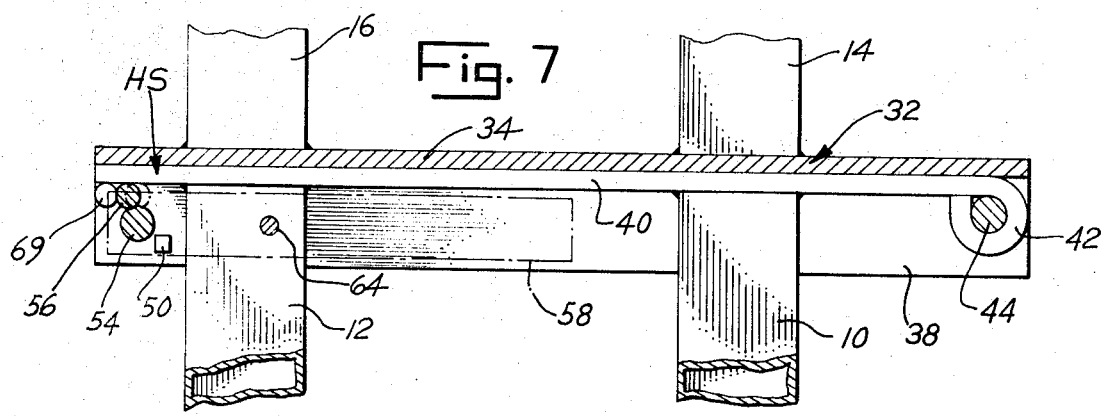
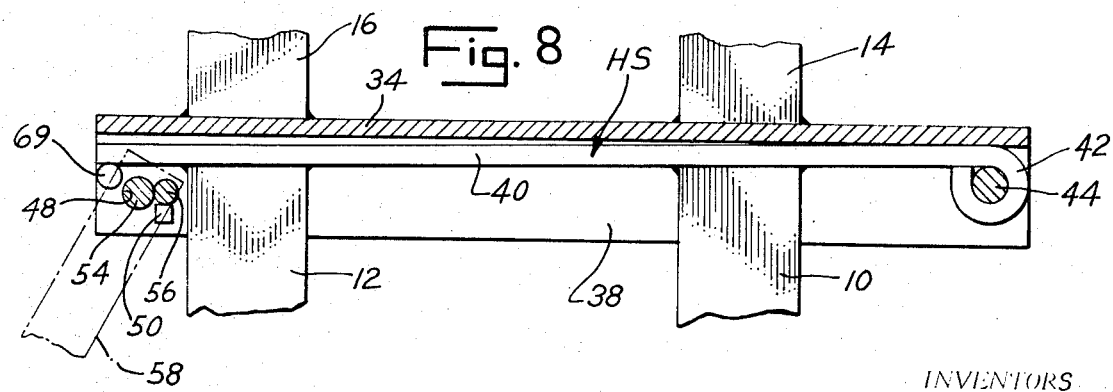
INVENTORS
KENNETH C. FACKLER &
WAYNE A. SCOTT
BY Bair, Freeman &
Molinare ATTORNEYS 3,542,138

LOCK STRUCTURE FOR FOLDING TOOL BARS

BACKGROUND OF THE INVENTION

For some years now agricultural implements have been used which are in the form of one or more "tool bars" spanning a width of 20 to 30 ft. which are adapted for supporting "tools" such as cultivator shanks, spring harrow teeth, liquid fertilizer knives and the like. The tool bars are made in sections such as a center section and wings. Various hinging or folding arrangements have been provided for reducing the overall width of the implements with the wing sections of the tool bars behind the center section so that the resulting width is something like 8 ft. for ready transport along a highway or through farm gates or the like. These hinging arrangements require lock pins, or other types of locks which are necessary to provide a tool bar that is rigid when in operation. A simple arrangement has been aligned perforations in the wings of the hinges into which locking pins can be dropped.

The tool bars are relatively heavy, especially when loaded with some types of tools, and it is sometimes difficult to fight a tight fitting lock pin through hard-to-line-up holes in the center section and a heavy awkward wing.

It is therefore an object of our present invention to provide a reliable lock structure for folding tool bars which overcomes the locking pin fitting difficulty just referred to.

Another object is to provide a hinge structure for adjacent normally aligned tool bars comprising a pair of hinge wings pivotally connected together wherein one of the hinge wings is channel-shaped to receive the other, and the flanges of the channel are provided with aligned perforations to receive a removable lock pin journaled in the perforations and having a camlike projection adapted to engage the other hinge wing and force it into tight engagement with the web of the channel-shaped wing upon rotation of the lock pin.

Another object is to provide a handle for rotating the lock pin and thereby to provide leverage for engaging the camlike projection with the web of the channel-shaped hinge wing.

Still another object is to provide a camlike guide block for the other hinge wing as it enters the channel-shaped hinge wing to guide the two into proper cooperation when closing the hinge structure.

A further object is to provide a simple lock pin and cam comprising a rotatable pin and a rod welded to a side thereof to serve as a camlike projection.

Still a further object is to provide a safety pin to prevent the handle from returning to unlocked position, thereby insuring that the tool bars will remain in aligned working position when the agricultural machine is being used.

Still a further object is to provide guide means for one section when folded against the other to guide the two into substantial alignment with each other and adjacent each other when the sections are folded for transport.

An additional object is to provide such guide means in the form of a U-shaped projection from one section to receive a tool bar of the other, and to provide a lock pin for the arms of the U-shaped projection to hold the sections in folded position during transport.

BRIEF SUMMARY OF THE INVENTION

A hinge structure is provided between two adjacent sections of the tool bars of an agricultural machine and comprises hinge wings and a novel lock structure in the form of a locking pin having a camlike projection for engaging one hinge wing with the other and locking them in that position during operation of the agricultural machine.

With these and other objects in view, our invention consists in the construction, arrangement and combination of the various parts of our lock structure for folding tool bars, whereby the objects above contemplated are attained, as hereinafter more fully set forth, pointed out in our claims and illustrated in detail on the accompanying drawings, wherein:

BRIEF DESCRIPTION OF THE DRAWINGS

FIG. 1 is a diagrammatic plan view of the folding type tool bars of an agricultural machine to which our lock structure has been applied, the bars being unfolded for operation.

FIG. 2 is a similar plan view showing the tool bars folded for transport.

FIGS. 3 and 4 are enlarged vertical sectional views on the lines 3–3 and 4–4 respectively of FIG. 1 and illustrate details of construction of our lock structure.

FIG. 5 is a perspective view of a partially opened hinge structure to which our lock structure is applied.

FIG. 6 is an enlarged elevation of the left hand end of FIG. 4.

FIG. 7 is an enlarged sectional view on the line 7–7 of FIG. 4 showing the hinge structure closed and the lock pin in operative position, and FIG. 8 is a similar sectional view showing the lock pin in an initial position.

DESCRIPTION OF THE PREFERRED EMBODIMENT

In FIG. 1 a tool bar type of agricultural machine is shown diagrammatically, and dimension lines indicate the following:
CS–center section
WS–wing section
OWS–outboard wing section These sections are extended for operation in FIG. 1, and in FIG. 2 have been folded for transport.

Our invention includes a hinge structure HS indicated generally in FIGS. 1 and 2 and shown in detail in FIGS. 4, 5, 6, 7 and 8. FIG. 3 also illustrates in detail a guide means G of our invention shown diagrammatically in FIGS. 1 and 2.

The center section CS is shown as having a pair of tool bars 10 and 12 while the wing sections WS each have tool bars 14 and 16 and the outboard sections OWS have tool bars 18 and 20. Four "tools" 21 are also shown although usually there are many more.

A pair of lower arms 22 and an upper arm 24 are provided on the center section CS to form the usual 3-point tractor hitch now in common use for supporting tool bars on tractors. Additionally, (especially in the case of exceptionally long tool bars) wheel brackets 26 are provided on the tool bars 20 and supporting wheels 28 are journaled on the brackets, particularly to prevent the outer tools from digging too deeply into the ground during sidewise tilt of the tractor on uneven ground.

We show outboard hinges 30 between the wing sections WS and the outboard wing sections OWS —diagrammatically only as they form no part of our present invention. The hinge structures HS however are shown more in detail and in FIGS. 1 and 2 it will be noted that these hinge structures pivotally mount the wing sections WS on the outer ends of the center section CS for folding from the position of FIG. 1 to the position of FIG. 2 wherein the outboard hinges 30 have also permitted folding. Accordingly, the tool bar structure as folded in FIG. 2 can pass through farm gates and can be transported on highways as the width has been reduced to a suitable dimension (that of the center section only) as compared to the operating dimensions shown in FIG. 1.

In the folded position of FIG. 2 lock brackets 29 on the outboard wing sections OWS may be locked to the tool bars 14 by lock pins 31 in an obvious manner to keep certain parts of the implement folded during transport.

Our hinge structure HS comprises a channel-shaped main hinge wing 32 having a web 34, an upper flange 36 and a lower flange 38. A secondary wing 40 is of flat bar type and has a hinge eye 42 through which a hinge pin 44 extends, the same being journaled in suitable perforations of the flanges 36 and 38. The outer ends of the tool bars 10 and 12 are welded to the web 34 and the inner ends of the tool bars 14 and 16 are welded to the secondary hinge wing 40. Accordingly, the hinge structure HS may be closed as in FIG. 1 or opened as in FIG. 2, FIG. 5 illustrating an intermediate position.

The flange 36 is provided with a keyhole perforation 46 and the flange 38 with a perforation 48, the two being provided for a lock pin 54, as best shown in FIG. 5. Adjacent the perforation 48 is a stop 50, and spaced a little farther toward the hinge pivot is a guide block 52 of tapered or camlike character.

The lock pin 54 is removably associated with the perforations 46 and 48 as illustrated in FIG. 5 and is provided with a cam pin 56 welded to one side thereof. A locking pin lever 58 is welded to the upper end of the lock pin 54 and the cam pin 56 for rotating them as a unit.

The lock pin lever 58 is provided with a safety pin perforation 60 and the flange 36 has a safety pin perforation 62. These perforations are provided for a safety pin 64 after the locking pin lever 58 is in locked position as will hereinafter appear.

A guide shown generally at G in FIG. 3 is provided for the tool bar 14 relative to the tool bars 10 and 12 in the folded position of FIG. 2, and comprises a lower bar 66 held in position on the tool bars 14 and 16 by U-bolts 67. The guide G also has a backstop 70 and an upper arm 68, the bar 66 and the arm 68 constituting the arms of a U-shaped guide to receive the tool bar 14 as illustrated. A lock pin 74 may then be passed through perforations of the arms 66 and 68 to lock the wing sections WS relative to the center section CS during transport. One edge of the bar 66 has an inclined surface as shown at 72 in FIG. 3 to guide the tool bar 14 into proper, substantially parallel aligned position with respect to the tool bar 10.

Referring to FIGS. 6 and 7, the hinge structure is in closed position with the wing 40 tightly engaged against the web 34 by engagement of the cam pin 56 therewith, and stopped by a stop rod 69 welded to the wing 40. A dotted position of the cam pin 56 (in FIG. 7) shows the maximum pressure point or position which has been passed in an "over-center" manner as shown by solid lines, whereupon the safety pin perforation 60 is in alignment with the safety pin perforation 62 and the safety pin 64 (shown in section) may be dropped into position, resting on the tool bar 12.

During the closing of the hinge structure as shown in FIG. 8, and just before it is completely closed, the wing 40 is close enough to the web 34 that the lock pin 54 and the cam pin 56 may be inserted to the position as shown. The lock pin lever 58 is in the position illustrated by dot-and-dash lines at that time. The lever may then be rotated counterclockwise to the position shown in FIG. 7 for first engaging the cam 56 with the hinge wing 40 and then forcing the wing into engagement with the web 34 as illustrated in FIG. 7. Thereafter when the safety pin 64 is inserted the operator of the implement is assured that the hinge structure will remain in closed position for taking the strains of operation imposed by pulling the center section and it in turn carrying the wing sections and the outboard wing sections during required operations on the ground surface such as cultivating, harrowing, planting, fertilizing and the like.

From the foregoing specification it will be obvious that we have provided a simple and efficient lock structure for a hinge of a folding tool bar of the type illustrated. The necessity of tightly fitted lock pins and the difficulty experienced in inserting them into perforations that are hard to align is eliminated by our lock pin 54 which can be inserted at a time when the parts are loosely associated as illustrated in FIG. 8. Thereafter, the locking pin lever 58 may be rotated for effecting a camming operation of the wings of the hinge structure so as to tightly engage them with each other and retain them in that position as shown in FIG. 7.

We claim:

1. In an agricultural tool bar, including at least two separate, adjacent sections being the type which fold one behind the other for ease of transportation, said folding sections including adjacent parallel end members respectively having inner and outer sides, the improvement of a hinge structure for hinging said sections together by said end members comprising, in combination:
    a fixed pivot connection between said end members at one end of said end members so that said sections separate and pivot about said connection when said sections are folded;
    a pair of flange portions extending from the opposite end of one of said end members over the other of said end members whenever said sections are unfolded, said flange portions including aligned locking pin openings closely spaced from the outer side of said one end member; and
    a removable locking pin journaled through said openings whenever said sections are unfolded, said pin having a cam means operatively engaging the inner side of said other end member to forceably move the other end member into tight engagement with said one end member upon rotation of said locking pin.

2. The improved tool bar of claim 1 wherein said locking pin includes a handle for rotating said pin to thereby engage said cam means with said other end member.

3. The improved tool bar of claim 2 including means for locking said handle in position whenever said sections are unfolded and locked together.

4. The improved tool bar of claim 1 including a cam guide block on one of said end members for engagement by the other of said end members to guide the other of said end members between said flange portions.

5. The improved tool bar of claim 1 wherein said locking pin opening comprises a keyhole-shaped opening and said locking pin includes a pivot rod and said cam means includes a rod attached to said pivot rod for engagement with said inner side of the other of said end members, the other of said end members including a stop rod attached thereto for engagement with said cam rod.

6. The improved tool bar of claim 1 including means attached to one section for guiding and retaining an adjacent section in proper alignment when said sections are folded against each other.

7. The improved tool bar of claim 6 wherein said means for guiding include a guide bar attached to one of said sections and extending from said section to provide a surface on which the adjacent section may be positioned and retained by locking means adapted to engage said adjacent section.